Nov. 5, 1940.  W. C. HAHN  2,220,839

ELECTRICAL DISCHARGE DEVICE

Filed July 14, 1937  5 Sheets-Sheet 1

Inventor
William C. Hahn,
by Harry E. Dunham
His Attorney.

Nov. 5, 1940.    W. C. HAHN    2,220,839
ELECTRICAL DISCHARGE DEVICE
Filed July 14, 1937    5 Sheets-Sheet 2

Inventor
William C. Hahn.
by Harry E. Dunham
His Attorney.

Inventor
William C. Hahn
by Harry E. Dunham
His Attorney.

Inventor
William C. Hahn,
by Harry E. Dunham
His Attorney.

Inventor
William C. Hahn,
by Harry E. Dunham
His Attorney.

Patented Nov. 5, 1940

2,220,839

UNITED STATES PATENT OFFICE 2,220,839

ELECTRICAL DISCHARGE DEVICE

William C. Hahn, Scotia, N. Y., assignor to General Electric Company, a corporation of New York Application July 14, 1937, Serial No. 153,602

21 Claims. (Cl. 250—27)

This invention relates to electrical discharge devices and to improved methods and means for controlling discharge currents. While not limited thereto, the invention is particularly useful in its application to amplifiers, detectors, oscillators and converters for use at very short wave lengths, on the order of 5 meters to 5 centimeters.

Inasmuch as an adequate explanation of the invention necessarily involves the repeated use of various terms of a more or less technical character, I have in the following paragraphs set forth the meanings which I desire to attach to certain such terms.

By "conduction current" I intend to designate a stream of moving charges, such, for example, as an electron beam current passing through an evacuated or gas-filled conduction space.

By "conduction current modulation" I mean to designate the controlled production of irregularities in a conduction current stream. Thus, a conduction current modulated electron beam is a beam in which at any given time systematic irregularities in electron velocity or electron density exist from point to point along the beam.

By "charge density modulation" I mean the controlled production of irregularities in the distribution of charges within a conduction current stream. Thus, a charge density modulated electron beam is a beam in which at any given time the electron density varies from point to point along the beam in accordance with some controlled pattern of variation.

By "velocity modulation" I mean the controlled production of irregularities in charge velocities within a conduction current stream. Thus, a velocity modulated electron beam is a beam in which at any given time the electrons at various points along the axis of the beam are moving with different velocities according to some controlled pattern of variation.

Quantitatively, any type of modulation may be measured as the ratio of the magnitude of the maximum departure of the modulated quantity from its average value to the magnitude of such average. Thus, a charge density modulated electron beam in which the electron density along the beam axis varies from zero to twice the average density may be said to possess one hundred per cent charge density modulation.

In conventional electronic vacuum devices the control member or grid is ordinarily so constructed and arranged as to affect directly the electron emission from the cathode, thus producing a type of "charge density modulation", as hereinbefore defined. It may be shown that the conduction current variations so produced by the grid have the effect of inducing a similarly varying current in the grid circuit. Under ordinary conditions and at low frequencies this induced current, which is caused by instantaneous differences in the electron charges approaching and receding from the grid, is relatively small and is approximately 90 degrees out of phase with the grid voltage, so that it produces no appreciable power loss. However, as the operating wave length is decreased so that the electron transit time becomes appreciable with respect to the reciprocal frequency ($1/f$) of the control grid potential variations, the induced current not only increases but becomes more nearly in phase with the grid voltage. These two effects combine to produce the result that the apparent shunt resistance of the grid circuit varies inversely as the second power of the frequency of the operating voltage. It is for this reason that at very high frequencies (i. e. very short wave lengths) the conventional type of grid attains such a low shunt impedance and involves such a large power loss as to be practically unusable.

It is a primary object of the present invention to provide an improved method and means for controlling an electronic discharge current whereby the production of current variations in the control circuit by the passage of the discharge current through the control element may be prevented and the shunt impedance of the control circuit maintained at a high value even when control potentials of very short wave length are involved.

Ancillary to this primary object it is a more particular object of the invention to provide a control electrode structure so constructed and operated as to produce primarily velocity modulation of the discharge current without the occurrence of appreciable charge density variations in the vicinity of the control electrode.

An important consideration from the standpoint of the utility of the invention lies in the fact that a relatively small amount of velocity modulation may under proper circumstances be converted into a substantially greater amount of charge density modulation, even approaching one hundred per cent modulation as a limit. Accordingly, it is feasible to amplify weak input or control potentials by using them to produce velocity modulation of an electron beam and by thereafter converting the velocity modulation into charge density modulation of a higher order of magnitude.

It is a further object hereof to provide methods and means, preferably independent of the control electrode structure, whereby velocity modulation produced by a control electrode may be effectively converted into charge density modulation.

A still further object consists in the effective application of the basic principles of the invention to amplifiers, detectors, oscillators and converters suitable for operation at very short wave lengths.

The features of novelty which I desire to protect herein will be pointed out with particularity in the appended claims. The invention itself, together with further objects and advantages thereof, may best be understood by reference to the following description taken in connection with the drawings in which

In the drawings above referred to I have indicated certain voltage ranges as being suitable for the operation of the various electrodes. It should be understood, however, that the values given are exemplary only, and that they may be varied within wide limits, even to the extent of changing their order of magnitude.

One important feature of the invention with respect to the production of velocity modulation of an electron stream consists in the provision of a modulating space which is substantially shielded from the stream source or cathode. By virtue of such shielding, current or potential variations which occur in the modulating space have no tendency to effect changes in the cathode emission or to produce charge density variations in the space as a result of such changes.

A modulating space as specified in the foregoing may comprise, for example, a space which is arranged to be traversed by an electron beam, and the entrance and exit boundaries of which are maintained at fixed potentials with respect to one another. Thus, in the particular arrangement shown in Fig. 1, a modulating space is provided between two apertured conducting barriers or diaphragms 10 and 11 which diaphragms are electrically connected to one another and maintained at a definite potential above ground. The chamber thus defined is, in use, traversed by an electron beam 13 which may enter through an opening 15 in the diaphragm 10 and leave through a corresponding opening 16 in the diaphragm 11.

In order to produce maximum velocity modulation of an electron beam traversing a modulating space such as that bounded by the diaphragms 10 and 11, the potential level of an intermediate region of the space may be cyclically raised and lowered with respect to the boundary potentials at such a rate that the velocity of any given electron in the beam is similarly affected as the electron approaches and recedes from such intermediate region. In connection with the particular structure of Fig. 1, this may be accomplished, for example, by the use of a control electrode in the form of a tube 19 which is positioned between the diaphragms 10 and 11 and spaced slightly from each of them. If the potential of this electrode is caused to vary above and below that of the diaphragms with the proper periodicity, as by connection to a source of cyclically varying control voltage 21, effective velocity modulation of the transmitted beam may be obtained. The "proper periodicity" as specified in the last sentence is determined by the following considerations.

Figure 1:
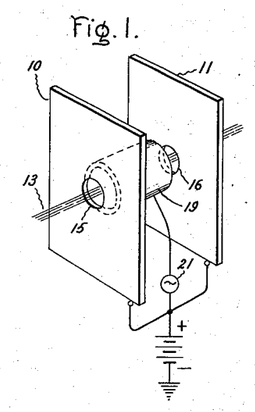
Figs. 1 to 3 are schematic representations illustrating certain basic elements of the invention.

Consider an electron which has just passed through the diaphragm 10 at a moment when the potential of the electrode 19 is at a positive maximum with respect to that of the diaphragm. Such an electron will obviously be accelerated in the approach space between the diaphragm and the open end of the electrode tube. In the case illustrated, the interior of the tube 19 constitutes an essentially field-free space, so that the velocity of the selected electron neither increases nor diminishes during its passage through the tube. If, however, the potential of the tube reverses so that the tube is at a potential minimum with respect to the diaphragm 11 at the instant the electron leaves the tube, then the electron will be again accelerated in the approach space between the tube and diaphragm. This is an effect which will be most pronounced if the transit time of the electron through the tube 19 corresponds to a half cycle of the control potential applied to the tube, or to some odd number of such half cycles.

I have so far considered the frequency of the control potential as the independently variable quantity. It will be obvious, however, that for any fixed frequency of control potential the electron transit time itself may be varied to fulfill the condition emphasized in the foregoing paragraph. This may be done as a practical matter either by changing the length of the tube 19 or by varying the speed of the electron beam.

Assuming that the various elements have been properly adjusted as I have proposed, it will be seen that there is available an extremely efficient mechanism for producing velocity modulation of an electron beam. With a given peak value of the control potential, certain electrons in the beam will be accelerated by an amount corresponding to a potential variation approaching twice that value, while others will be retarded by an equal amount. The ratio actually existing between the maximum electron acceleration or retardation (expressed in volts) and the peak value of the control potential may be called the "velocity ratio" of the control electrode. It will vary somewhat with the electrode geometry, but for the construction illustrated will be only slightly less than two.

It may also be noted that the production of velocity modulation by the method and means so far described is accomplished without appreciable power loss in the control circuit. This is due to the fact that the current variations produced in the vicinity of the control electrode structure are actually extremely small so that the resulting current induced in the control electrode is substantially negligible. As has been previously suggested herein, the utility of the invention lies partly in the fact that slight velocity variations, produced without substantial power loss, may be subsequently and, in a sense, automatically converted into much greater magnitudes of charge density variation.

Figure 2:
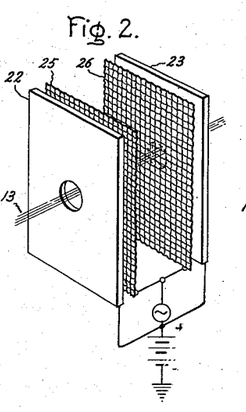

The precise form of control electrode structure shown in Fig. 1 is in no way essential for the purposes of the invention, and I have shown in Fig. 2 another structure which may be alternatively used. In this figure the diaphragms 22 and 23 correspond generally to those already described in Fig. 1. The control electrode structure, however, comprises a pair of wire grids 25 and 26 which are spaced to enclose a region of substantially the same axial extent as the region enclosed by the tube 19 of Fig. 1. Since these members are electrically connected together, this enclosed region constitutes a substantially field-free space; consequently, if the potential of the grids is cyclically raised and lowered with the proper periodicity as previously specified, velocity modulation of a passing electron beam will occur.

Figure 3:
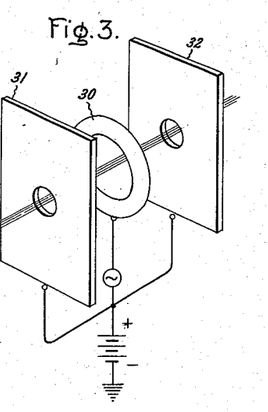

A still further possible modification of the control electrode structure is shown in Fig. 3, in which the control electrode differs from those previously described in comprising a conducting member of negligible axial extent. This member is illustrated as a ring 30, but may alternatively comprise an apertured diaphragm or other equivalent structure.

With this arrangement the optimum conditions to be fulfilled are somewhat different from those previously postulated. Specifically, it is desired that the electron transit time between either of the boundary diaphragms 31 and 32 and the plane of the control electrode correspond to a half cycle of the control potential. This being true, an electron which enters the modulating space at the instant the control electrode has assumed a positive potential will be accelerated throughout the duration of its passage from the plane of the diaphragm 31 to the plane of the control electrode. Also, since a voltage reversal occurs as the electron passes the control electrode, it will be again accelerated during the entire period of its passage from the plane of the control electrode to the plane of the diaphragm 32. In the same way an electron which enters the modulating space one-half cycle later will be retarded both as it approaches and as it recedes from the ring 30. A similar result will be obtained if the transit time between each of the boundary diaphragms and the control electrode is an odd multiple of one-half cycle rather than a single half cycle as described in the foregoing.

Having now explained some of the basic principles of the invention, I shall in the following illustrate its utility in connection with various discharge devices. For simplicity, I shall describe the use of the invention mainly with reference to discharge devices adapted to be used as amplifiers. It should be understood, however, that the various features referred to are not limited to such application and may in certain cases be even more advantageously employed in connection with detectors, oscillators, converters, etc.

Figure 4:
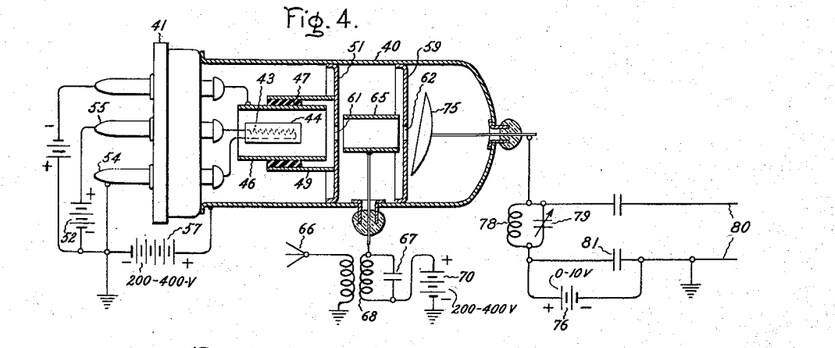
Fig. 4 is a discharge device embodying one application of the invention.

Referring particularly to Fig. 4 I have shown a discharge device which comprises a sealed metal envelope including an elongated tubular portion 40 and a base portion 41 sealed thereto. Within the envelope there is provided means for developing an electron beam of substantially constant average intensity and velocity. Such means may include any known type of "electron gun," and that illustrated constitutes only one example of many possible constructions. In the arrangement shown, the electron source comprises a thermionic cathode including a filamentary heater 43 and an enclosing cylinder 44. Surrounding the cathode as a whole there is provided a focusing electrode in the form of a conducting tubular member 46. This latter element is supported directly by an insulating bushing 47 and indirectly by means of a second tubular member 49 which is rigidly secured to a transverse barrier 51.

In the use of the device the filamentary heater 43 is energized by means of a suitable energy source, such as a battery 52 connecting with the heater through bayonet contacts 54 and 55 and lead-in connections associated therewith. The focusing electrode 46 is in the normal case maintained at cathode potential or at a potential which is slightly negative with respect to the cathode, and when so charged is effective to concentrate the electrons emitted from the cathode surface into a beam of generally cylindrical outline. Such a beam may be given the desired velocity by impressing an appropriate potential between the cathode and the transverse diaphragm 51. The magnitude of the potential to be applied will vary within wide limits depending on the conditions of operation. For a particular case it may be on the order of from 200 to 400 volts and may be provided by means of a battery 57 connected between one of the cathode terminals and the metal structure of the discharge envelope.

Somewhat spaced from the conducting member or diaphragm 51 there is provided a second diaphragm 59 which is in the case illustrated maintained at an identical potential with the first diaphragm by being electrically connected thereto. These diaphragms are respectively provided with central apertures 61 and 62 and in combination define a chamber which is shielded from the beam source or cathode. In the contemplated use of the device this shielded chamber may constitute a modulating space in which the velocity of the constituent electrons of an electron beam traversing the space may be affected or modulated in a desired manner. Such velocity modulation may be accomplished, for example, in any of the ways described in connection with Figs. 1 to 3 and in the particular arrangement illustrated I have shown a tubular control electrode 65 of the particular type illustrated in Fig. 1.

In the use of the device as an amplifier the potential of the electrode 65 may be alternately raised and lowered by impressing thereon a cyclically varying control potential. This may be derived, for example, from a high frequency input circuit shown as including an antenna 66 and a tuned circuit comprising a condenser 67 and an inductance 68. A battery 70 is also employed to impress on the control electrode structure a direct current potential of the same order of magnitude as that impressed on the diaphragms 51 and 59.

Assuming the device to be in normal operation, the electron beam issuing from the opening 62 will be velocity modulated; that is, it will be characterized by successive variations in electron velocity from point to point along the beam. The degree of modulation may be extremely slight if only weak control potentials are available, but it may be changed into charge density modulation of a considerably higher order of magnitude by conversion means now to be described.

Such means may comprise, for example, a collecting electrode or anode 75 positioned in alinement with the opening 62. This anode, which is substantially shielded from the modulating space by the diaphragm 59, may be biased, as by a battery 76 to such a low voltage that only approximately one-half of the electron beam is collected, the other half being reflected back along the beam axis. If the beam is velocity modulated as described above, the faster electrons may hit the collector while the slower ones fail to reach it. Since the faster and slower electrons are respectively bunched in alternately spaced groups along the axis of the beam, it will be seen that both the collected current and the reflected current will be charge density modulated.

This particular method and means of converting velocity modulation into charge density modulation by reversing the lower velocity components of the beam is the invention of George F. Metcalf and is claimed by him in his application Serial No. 201,953, filed April 14, 1938.

Figure 4A:
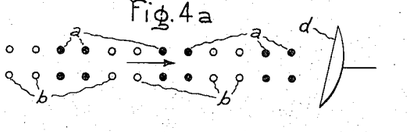
Figs. 4a, 4b and 4c are diagrammatic representations useful in explaining the operation of the device of Fig. 4.
Figure 4B:
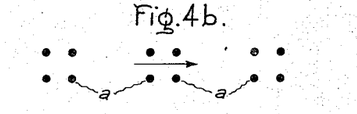
Figure 4C:
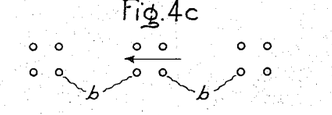

The method of separating fast and slow electrons described in the foregoing will, perhaps, be better understood by referring to the diagrammatic representations of Figs. 4a, 4b and 4c. In Fig. 4a, for example, there is shown an imaginary stream of electrons which is velocity modulated so as to comprise alternate groups of fast and slow electrons. The fast electrons are represented by the groups $a$, for example, and the slow electrons by the groups $b$. The line $d$ represents the plane of the collecting anode hereinbefore described. In Figs. 4b and 4c, I have shown the components of the electron beam which have been respectively collected and reflected by the anode $d$. It will be seen that each of these components is characterized by successive variations in charge density and is therefore charge density modulated within the definition of that term previously given herein.

From a consideration of the idealized situation represented in the foregoing it might seem that even the slightest degree of velocity modulation of the electron beam would produce 100 per cent charge density modulation of both the collected and reflected components of current. That this is not so is due in part to the random electron velocity variations inevitably present in the beam even before modulation takes place. Because of such variations the ideal grouping of fast and slow electrons shown in Fig. 4a cannot actually occur, some slow electrons being necessarily mixed with the fast groups and vice versa. This being so, some random fast electrons are collected from even the slow electron groups and some random slow electrons are reflected from the fast groups. As a result, a given amount of velocity modulation produces through the mechanism described an amount of charge density modulation which may be considerably lower than 100 per cent and which is variable with the degree of velocity modulation involved.

Figure 5:
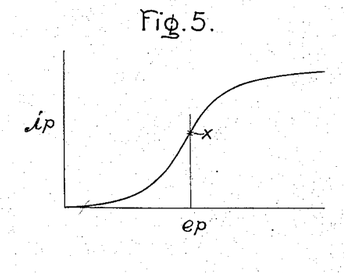
Fig. 5 is a graphical representation illustrating certain of the characteristics of the device of Fig. 4.

The actual relation between velocity modulation and charge density modulation is determined by the slope of the $e_p$—$i_p$ static curve of the collector as illustrated in Fig. 5. This slope, which for any given tube is fixed by the random electron velocity variations occurring in the discharge stream, may be very steep for practical tube constructions. Consequently, if such a bias is applied that the collector operates, say, at the point X, substantial amplification may be accomplished. The degree of amplification obtainable is as a matter of fact very much larger than has heretofore been possible with wave lengths on the order of from 5 meters to 5 centimeters or less.

In the use of the above-described device as an amplifier care must be taken to prevent the reflected portion of the beam from returning into the modulating space and causing regenerative oscillations by its reaction on the control electrode. The occurrence of such an effect may be prevented by tilting the collecting anode slightly as illustrated so that the reflection of the beam occurs in a direction calculated to cause it to impinge on a solid portion of the diaphragm 59. (This particular feature is the invention of Harry L. Thorson and is fully described and claimed in his application Serial No. 264,877, filed March 30, 1939.)

The conduction current variations induced in the anode 75 by means of the charge density variations in the collected and reflected components of the electron beam may be converted into an alternating potential by means of a tuned circuit comprising an inductance 78 and a capacitance 79. This in turn may be connected to an output circuit whose terminals are indicated at 80. A condenser 81 shunting the battery 76 permits the unimpeded passage of radio frequency currents to these terminals. (By the term "circuit" as used herein and in the appended claims I intend to designate not only such circuits as are formed by the combination of lumped impedance elements, but also those which include resonant structures such as standing wave transmission lines and the like.)

Figure 6:
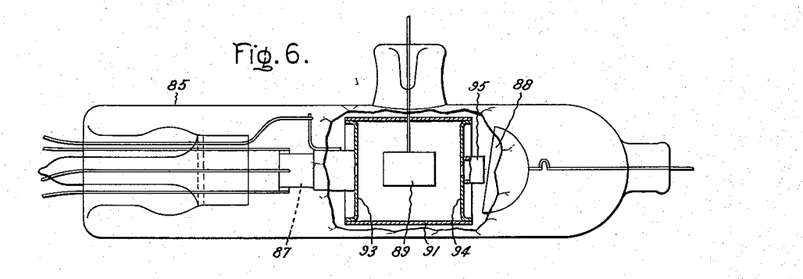
Fig. 6 is a perspective view in partial section of a structural modification of the device of Fig. 4.

The structural features illustrated in Fig. 4 are not essential to the invention, and in Fig. 6 there is shown a generally similar device which is enclosed in a glass envelope 85 rather than in a metal container as previously described. It will be seen that the device comprises a cathode (not shown), a focusing member 87, and an anode 88, and a modulating grid 89, all of which correspond to the elements similarly identified in connection with Fig. 4. The modulating space, however, is in this case defined by a conducting cylinder 91 which is closed at its axial extermities by means of apertured diaphragms 93 and 94 which resemble the diaphragms 51 and 59 of Fig. 4. The diaphragm 94 is provided with a flange 95 surrounding its central aperture, which flange assists in properly directing the electron beam with respect to the surface of the collecting electrode 88.

The control electrode structures so far described have been of such nature as to provide an enclosed substantially field-free space which is traversed by the electron stream. In connection with relatively longer wave lengths, it is difficult to stay within practical dimensions and still fulfill the condition that the electron transit time through the electrode structure shall correspond to a half cycle of the control potential. This is due to the fact that the duration of such a half cycle may be so great that for high electron velocities the control electrode would have to be of great length. This difficulty might be overcome in one way by reducing the electron velocity as by operating the control electrode at a low average potential with respect to the boundaries of the modulating space. Such a mode of operation is to a certain extent objectionable, however, in that it inherently increases the electron transit time through the approach spaces existing between the boundaries and the extremities of the control electrode structure. For reasons which need not be stated here, such an increase in transit time tends to reduce the modulation factor of the control electrode.

Figure 7:
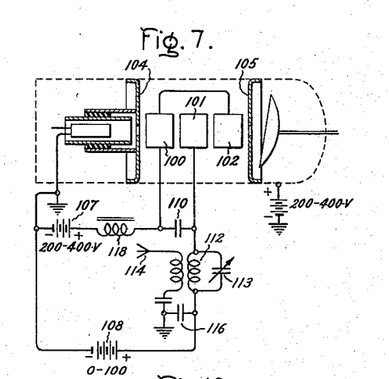
Figs. 7, 8 and 9 show schematically further modifications of the device of Fig. 4, especially with respect to the provision of various means for converting velocity modulation into charge density modulation.

In Fig. 7 I have shown an alternative arrangement of the control electrode structure which may be advantageously employed with control potentials of relatively long wave length without encountering the difficulty noted in the foregoing. In this case the control electrode comprises a tubular member having electrically separate sections 100, 101 and 102 arranged coaxially with the electron path and extending to within a short distance of transverse diaphragms 104 and 105 which define a modulating space. In this figure and in those which follow, it should be understood that the transverse diaphragms are connected to the discharge envelope which is indicated in dotted outline.

In the operation of the device as thus constructed, the control electrode sections 100 and 102 are electrically connected together so as to be maintained at the same potential. Their average potential, as determined, for example, by means of a battery 107, may be of the same order of magnitude as that of the boundary diaphragms 104 and 105 so that the electron transit time through the approach spaces is relatively short. The electron transit time through the control electrode, on the other hand, may be appreciably increased without adding to its length by operating the central section 101 at an average potential substantially below that of the end sections. This may be accomplished, for example, by means of a biasing battery 108 the potential of which is considerably less than that of the battery 107.

Although the electrode section 101 is insulated from the other sections as to direct current potentials, it is effectively connected to them as far as alternating potentials are concerned by means of a condenser 110. Consequently, the potential of the control electrode as a whole may be cyclically raised and lowered at radio frequency by means of a tuned input circuit comprising, for example, an inductance 112 and a capacitance 113, energy being supplied to this circuit from an antenna 114 coupled thereto. The input circuit is insulated from ground as far as direct currents are concerned by means of a blocking condenser 116. Also, the end sections of the control electrode are insulated from ground with respect to radio frequency potentials by means of a choke 118.

A further advantage of the construction described consists in the fact that it is effective to prevent defocusing or spreading of the electron beam. Due to space charge effects within the beam there is a strong tendency for such spreading to occur after the beam has moved an appreciable axial distance. With the control electrode arrangement indicated, the fields existing between the various electrode sections are such as to comprise an electron lens system adapted to maintain the beam in focus during its passage through the electrode structure.

Figure 8:
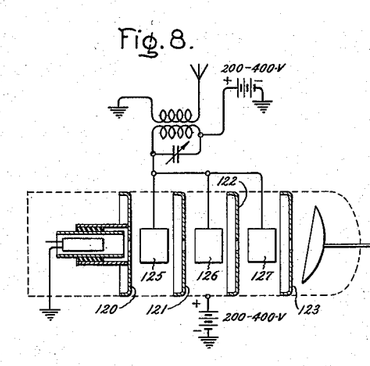

The mechanism of velocity modulation described in connection with Figures 4, 6 and 7 may be still further enhanced by employing a number of successive modulating grids arranged in cascade. One such arrangement is illustrated in Fig. 8, in which the chambers between the diaphragms 120 to 123 constitute a succession of modulating spaces. The tubular electrodes 125, 126 and 127 comprise a corresponding series of modulating grids.

As shown, the three grids are operated at the same potential and are energized from a common input source of the type already described. In order to accomplish the result that any given electron shall be similarly affected as to velocity as it passes through each of the modulating spaces a somewhat different dimensional relationship must be maintained than has been previously referred to. Specifically, with tubular electrodes as illustrated, it is necessary that the transit time through each of the electrodes correspond to some even number of half cycles of the control potential, and that the transit time between the extremity of any electrode and its nearest boundary diaphragm comprise an odd number of such half cycles. Assuming the simplest case, viz: that in which the transit time through each grid corresponds to two half cycles and the transit time through each approach space comprises one half cycle, it may be readily demonstrated that the desired result will be obtained. Thus, an electron which enters the first approach space at a time when the control electrode structure has just entered a positive phase will be accelerated during the entire period of its transit from the diaphragm 120 to the opening of electrode 125. During its passage through the electrode it will be substantially unaffected as to velocity and will reach the further extremity of the electrode just as the electrode enters a negative potential phase. The transit time through the space between the electrode 125 and the diaphragm 121 will, if the specific conditions are fulfilled, consume a time corresponding to a half cycle of the control potential. Consequently, the entrance of the electron into the next modulating space will be coincident with the initiation of a positive phase of the control potential. Under these circumstances it is clear that the selected electron will be repetitively accelerated during its entire course through the electrode system. Similarly, an electron which enters the first modulating space one-half cycle later will be uniformly decelerated during its entire transit through such system.

An effective cascade arrangement of grids may also be realized by utilizing a succession of structures of the type illustrated in Fig. 3 wherein the axial extent of the control grid itself is substantially negligible. Adding this possibility to those enumerated in the foregoing paragraph, it may be stated that the optimum conditions for a cascade grid construction are (1) that the electron transit time through each control grid should be either negligible or approximately equal to an even multiple of half cycles of the control potential, and (2) that the transit time through the approach spaces between the boundary diaphragms and the extremities of the control grids should correspond to an odd number of half cycles.

It has been noted that when the collecting anode serves simultaneously as a beam reversing means and as an output electrode for connection to an output circuit, its apparent shunt impedance is undesirably low. This difficulty may be overcome in one way by the arrangement indicated in Fig. 9, in which the reversing and output functions are accomplished by separate elements. This may be done, for example, by positioning before the output anode a reversing electrode 128 which is biased at such a voltage as to reverse at least the lower velocity electrons and to transmit higher velocity electrons. The transmitted component of beam current is charge density modulated in accordance with the principles previously explained and when collected by the anode 129 will produce alternating potential variations across the terminals of the output circuit.

Figure 9:
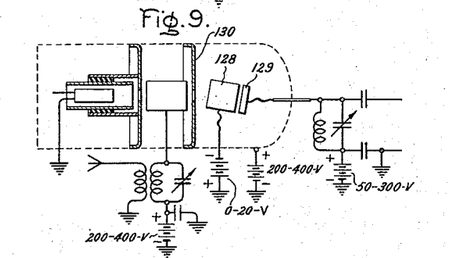

With the arrangement shown the anode 129 may be biased to a sufficiently high positive potential so that it collects all electrons transmitted by the electrode 128. The reverse component of current is so deflected by suitably tilting the electrode 128 as to intersect a solid portion of the boundary diaphragm 130, thus being prevented from returning into the modulating space where it might tend to produce regenerative oscillations.

Figure 10:
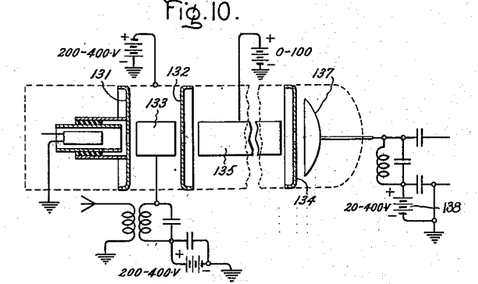
Fig. 10 illustrates still another means for converting velocity modulation into charge density modulation.

The conversion of velocity modulation into charge density modulation has so far been described exclusively in connection with the use of means for separating the modulated beam into collected and reflected components. In Fig. 10 there is illustrated an alternative means for accomplishing such conversion which is dependent upon a somewhat different principle. The device shown comprises a modulating space confined by diaphragms 131 and 132, and a modulating grid 133 of the same general character as those previously referred to. Following the modulating space, however, there is provided a "drift space" bounded by the diaphragm 132 and by a third diaphragm 134. Within the space there is provided a cylindrical member or "drift tube" 135 similar to the control electrode 133 but preferably of substantially greater length. It is a function of this member to provide in the path of the electron beam an extended field-free space or a space which is substantially free from any but static potentials.

If the potential of the control electrode 133 is raised and lowered with respect to the diaphragms 131 and 132 in accordance with the procedure already described, the electron stream which enters the drift tube 135 will comprise alternately spaced groups of "fast" and "slow" electrons. It will be apparent that under these conditions there will be a definite tendency for the more rapidly moving electrons to catch up with those which are moving more slowly. It is the purpose of the tube 135 to provide a "drift space" in which a definite bunching of electrons can occur as a result of this tendency. The nature of the results desired to be obtained will best be understood by referring to Figs. 10a and 10b which comprise an idealized representation of two successive conditions of a velocity modulated electron beam.

Figure 10A:
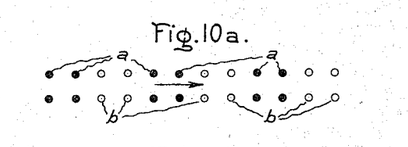
Figs. 10a and 10b are diagrams which are useful in explaining the operation of the device of Fig. 10.
Figure 10B:
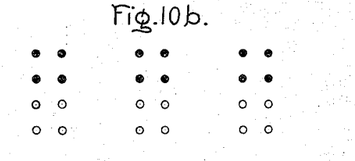

In Fig. 10a the electron beam is shown as it is assumed to issue from the modulating space. It will be noted that at this time it comprises alternate spaced groups of fast electrons $a$ and slow electrons $b$ as previously explained. In Fig. 10b the condition of the same beam at a somewhat later period is illustrated. As shown, the fast electrons have caught up with the slow electrons so that definite irregularities in charge density distribution have been produced corresponding to a high degree of charge density modulation. The change which has taken place is from its nature one that requires only the elapse of time and the absence of extraneous influences which might tend adversely to affect conditions within the beam. These requirements may be fulfilled in a practical manner by permitting the velocity modulated beam to pass through a relatively long shielded space such as is provided in Fig. 10 by the drift tube 135. The necessary length of this tube is determined both by the degree of velocity modulation and by the average velocity of the electron beam as a whole. Generally speaking, and considering only idealized conditions, the time required to realize complete charge density modulation as illustrated in Fig. 10b would correspond approximately to the duration of a quarter cycle of the control potential divided by the per unit velocity modulation. (Per unit velocity modulation is the peak velocity variation divided by the average beam velocity.) The length of a drift tube adapted to afford such time would be this time multiplied by the average velocity of the beam through the tube. Since the per unit velocity modulation produced by an input signal is a small fraction of unity, it is apparent that the drift tube length will ordinarily be relatively long in comparison with the distance traversed by the beam during a single cycle of the control potential. The beam velocity and, consequently, the drift tube length may be somewhat reduced by operating the tube at a lower potential than that of the boundary diaphragm 131 in order that the beam may be retarded as it enters the tube. Also, it is not necessary as a practical matter that the drift tube be of such length as to permit complete conversion of the velocity modulation into charge density modulation as represented in Fig. 10b. A considerably smaller degree of conversion will be effective to produce substantial amplification of the input potential if that is the desired end result.

In an amplifier utilizing a drift tube as a conversion means the charge density modulated current issuing from the drift tube may be utilized in an external circuit by collecting the entire beam at an anode 137. In this case the anode is preferably biased as by means of a battery 138 to such a voltage that substantially none of the components of the beam will be reflected.

Figure 11:
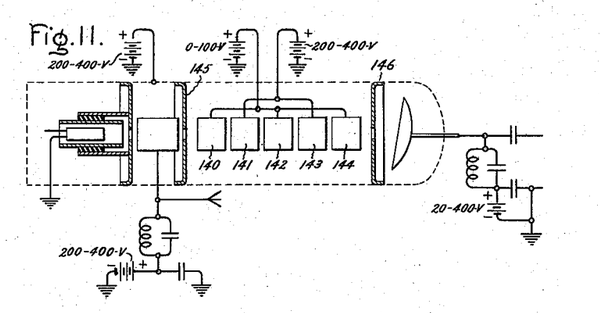
Fig. 11 is a modification of the device of Fig. 10.

I have previously referred to the inherent tendency of an electron beam to become defocused or spread after passage through an appreciable space. This difficulty insofar as it occurs in connection with the use of a drift tube may be substantially overcome by a drift tube construction as illustrated in Fig. 11. In this figure the drift tube comprises a plurality of electrically separate similar sections 140 to 144, alternately spaced sections being electrically connected together as shown. The end sections 140 and 144 are preferably operated at a relatively low potential with respect to the boundary diaphragms 145 and 146 so that the average beam velocity is reduced as the beam enters the drift tube structure. By operating the intermediate sections 141 and 143 at a somewhat higher potential a definite self-focusing effect may be obtained throughout the length of the drift tube. This effect is due to lens action produced by the interacting fields of adjacent tube sections and is effective to counteract the inherent tendency of the beam to spread. Consequently, an extremely long drift space can be provided without danger of the beam current being collected by the walls of the drift tube structure.

The focusing system described in the preceding paragraph is the invention of George F. Metcalf and is claimed by him in his application Serial No. 201,954, filed April 14, 1938.

Figure 12:
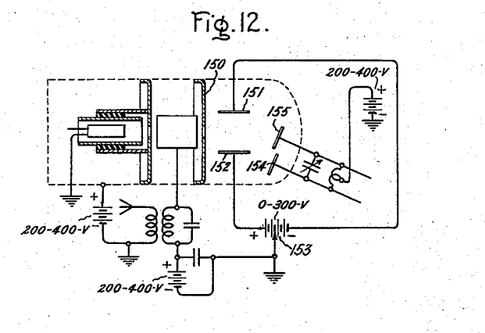
Figs. 12 and 13 illustrate still other means for converting velocity modulation into charge density modulation.

A still further mechanism for the conversion of velocity modulation is illustrated in Fig. 12. In this figure a modulated beam issuing through a central aperture in the diaphragm 150 is caused to pass through a transverse electrostatic field provided, for example, by electrodes 151 and 152. As is well known the amount of deflection produced by such a field is determined by the velocity of the charges being deflected. Consequently, an effective separation of the higher and lower velocity components of the beam may be accomplished by this means. The lower velocity electrons will be most deflected and may be collected by means of an appropriately positioned anode 154. A similar anode 155 placed more nearly adjacent the normal path of the beam will collect the less deflected and, consequently, higher velocity electrons. For reasons pointed out in connection with Fig. 10 each of the separate components will comprise spaced electron groups and will therefore be charge density modulated as previously explained. This charge density modulation may be most effectively utilized in an output circuit by connecting the anodes 154 and 155 to such a circuit in push-pull relationship as illustrated.

The deflection field referred to in the foregoing paragraph may be produced by impressing a direct current potential between the electrodes 151 and 152 by means of a battery 153. Also, instead of an electrostatic field one may alternatively employ a magnetic field as a deflecting means.

Figure 13:
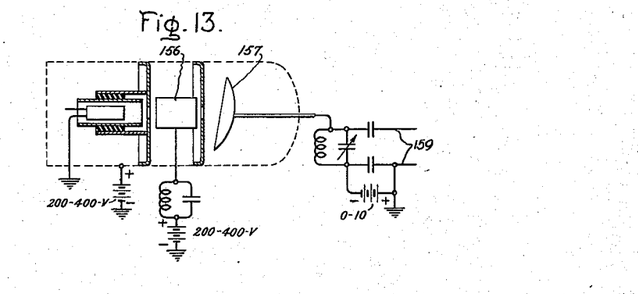

There exists still another mode of converting velocity modulation into charge density modulation which may be conveniently explained in connection with Fig. 13. The construction shown in this figure resembles that of Fig. 4 in that it includes a similar velocity modulating grid 156 and a tilted anode 157. It differs from it, however, in that the anode 157 is biased to such a low voltage (zero or several volts negative) as to repel all electrons in the approaching beam. I now propose to show that by such repellent action the velocity modulation of the beam may be converted into charge density modulation.

Figure 13A:
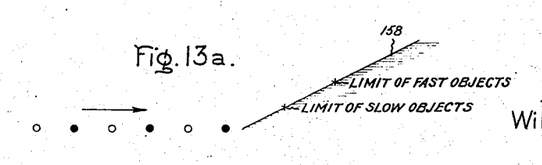
Fig. 13a is a diagram which is useful in explaining the operation of the device of Fig. 13.

The demonstration may be clarified by reference to an analogy which is represented in Fig. 13a. In this figure the small light circles are assumed to indicate relatively slowly moving rolling objects approaching an incline 158, whereas the black circles indicate more rapidly moving objects approaching the same incline. In the condition illustrated the procession of objects is "velocity modulated" although it is not "density modulated."

Assuming that the incline is of such steepness and length as to be insurmountable by either the fast or the slow objects, the differently moving objects will roll up the incline to different levels before reversing. By properly choosing the steepness of the incline a condition may be reached such that two successive objects which approach the incline with given differences in velocity may be caused to roll off the incline at precisely the same instant. It is clear that the resultant grouping, if repetitive for succeeding objects, actually comprises a form of density modulation.

While the analogy above drawn is imperfect in some respects as referred to a velocity modulated electron beam, it is sufficiently accurate so that we may regard the action of such a beam in approaching the retarding field as being equivalent to that of differently moving objects in approaching a retarding incline. By proper adjustment of the potential of the retarding field with respect to the degre of velocity modulation and to the axial spacing of velocity maxima and minima, an arrangement may be reached in which effective charge density modulation will obtain in the reversed portion of the beam. In receding from the vicinity of the anode 157 the charge density modulated beam will induce in the anode current variations which will produce an alternating current potential across output terminals 159. Furthermore, the ratio of charge density modulation to velocity modulation may be such that the tube operates with a substantial amplification factor. It should be understood, however, that the principle of converting velocity modulation into charge density modulation by reversing the entire electron beam can also be applied in connection with oscillators, detectors or other types of discharge device.

Ordinarily, the potential gradients produced by the use of a negatively charged reversing electrode are so steep that the sorting effects attributable to it are not very great. In operation, however, the potential gradients may be favorably tapered, either by space charge due to the effect of the reversing beam, or by special space charge electrodes appropriately positioned in the reversing space.

Figure 14:
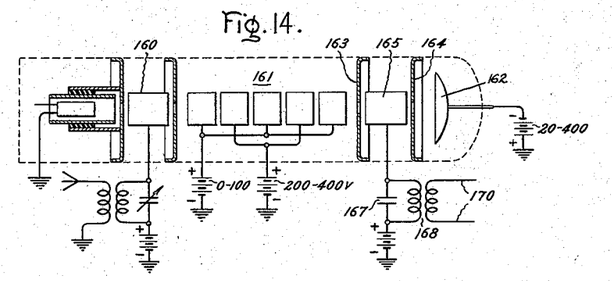
Figs. 14, 15 and 16 show various discharge devices illustrating the use of the invention in converting kinetic energy in a charge density modulated electron beam into electrical energy to be utilized in an external circuit.

In Fig. 14 there is shown an alternative means by which energy may be abstracted from a charge density modulated electron beam. In this case the velocity modulating means comprises a tubular grid 160 of the same general type as those previously described herein. The means for converting the velocity modulation into charge density modulation comprises, for example, a multi-sectional drift tube 161 similar to that described in connection with Fig. 11. An anode 162 serves to collect the entire electron beam after its alternating potential energy has been effectively utilized as described in the following.

The charge density modulated beam issuing from the drift tube 161 is permitted to enter an energy conversion space defined between boundary diaphragms 163 and 164. Within this conversion space there is provided a tubular electrode structure 165 which, although similar to the control grid 160 in construction, is opposite to it in function in that its purpose is to convert the kinetic energy of the charge density modulated beam into electrical energy at alternating potentials to be utilized in an external circuit. The mechanism by which such conversion is accomplished is as follows:

Assuming that a group of charges passes through the central opening in the diaphragm 163 and approaches the electrode 165, it will tend to induce a current in such electrode. If the beam is of substantially constant intensity or is "unmodulated," this tendency will be neutralized by the equal and opposite effect of the charges leaving the electrode. However, if the beam is charge density modulated so as to permit of a substantial difference between the approaching and leaving charges, a pulse of conduction current may be induced in an external circuit connecting with the electrode. Brief consideration will show that the most favorable condition is that in which the electrode 165 has a length which corresponds at least approximately to the distance between successive charge density maxima and minima in the beam or to some odd multiple of such distance. If this is true, the approach of a charge maximum will coincide with the recession of a charge minimum and the resultant effect as viewed in the external circuit will be at its greatest possible value. The region enclosed by the electrode 165 should preferably extend to within a short distance of the diaphragms 163 and 164 so that the electron approach spaces are as small as possible.

It should be noted that as a given charge group leaves the electrode 165 and moves toward the boundary diaphragm 164, it will induce in the electrode a current pulse opposite in sign to that produced during the approach period. Accordingly, by use of an external circuit of proper characteristics, including, for example, a condenser 167 and an inductance 168, an alternating potential of appreciable magnitude may be developed across output terminals 170.

It is an important feature that by the means described in the foregoing a single variation in charge density is caused to produce a double excitation of the external circuit. Stated in another way, an electrode such as 165 is effective to abstract energy at two different times from the same group of moving charges by a mechanism which is equivalent to a "current doubling" process. By employing a plurality of similar tubular anodes in cascade, it is possible to extend this principle still farther and to collect or induce total currents of considerable magnitude. The energy thus developed in the output circuit is obtained, of course, by a reduction in the average velocity of the electron beam. The actual energy conversion process may then be said to consist in changing the high voltage low current energy of the beam into high current low voltage energy in the output circuit.

The construction of the electrode 165 is not limited to the form shown but may include any of the alternative arrangements described in connection with Figs. 1 to 3 inclusive. In any case most effective operation of the device with respect to energy conversion is attained when the electrode and the energy conversion space are so proportioned with respect to the distance between successive charge density maxima and minima in the beam that any given electron is similarly affected as it approaches and recedes from the region affected by the electrode. The dimensional requirements for this result are in general the same as were prescribed in connection with Figs. 1 to 3.

Figure 15:
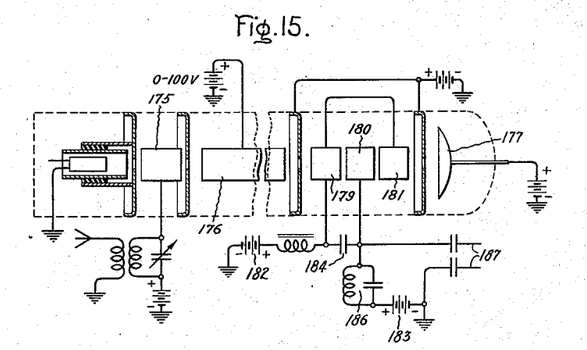

Fig. 15 represents a slight modification of the discharge device of Fig. 14 with respect to the construction of the energy abstracting electrode. In this case, there are provided a velocity modulating grid 175, a drift tube 176 and a collecting anode 177 corresponding in essential particulars to those previously described. The energy abstracting electrode, however, comprises a plurality of sections 179, 180 and 181, respectively.

Of these the end sections 179 and 181 are electrically connected together and are maintained at the same direct current potential by means of a battery 182 while the center section 180 is preferably maintained at a lower direct current potential by means of a battery 183. In this way one obtains the result of increasing the transit time of electrons through the electrode structure and of maintaining the electron beam in focus during said transit. The advantages of such an arrangement, particularly in connection with lower frequency operating potential, have been fully explained in connection with Fig. 7 and need not be further elaborated upon here.

The various sections of the energy abstracting or converting electrode are maintained at the same potential as far as alternating voltages are concerned by means of a condenser 184 which is, of course, a direct electrical connection for radio frequency currents. Consequently, variations in potential produced in either of the end sections by an approaching or receding charge group similarly affects them and in connection with a charge density modulated electron beam will produce an alternating potential across the tuned circuit 186 and the output terminals 187.

The mechanism of energy abstraction described in connection with Figs. 14 and 15 may also be utilized with devices other than a drift tube, for converting velocity modulation into charge density modulation. For example, in Fig. 16 there is illustrated the combination of a tubular energy abstracting electrode 190 with a beam reversing anode 191 of a type previously described herein. In the arrangement illustrated, an electron beam proceeding from a cathode 192 is velocity modulated by means of a grid 193 and is permitted to approach the anode 191 which anode is operated at a sufficiently low potential to reverse at least the lower velocity components of the beam. The charge density modulated reversed component is permitted to enter an energy conversion space defined between boundary diaphragms 195 and 196 but is so directed by means of a tilted arrangement of the anode 191 as to impinge on a solid portion of the diaphragm 196.

Figure 16:
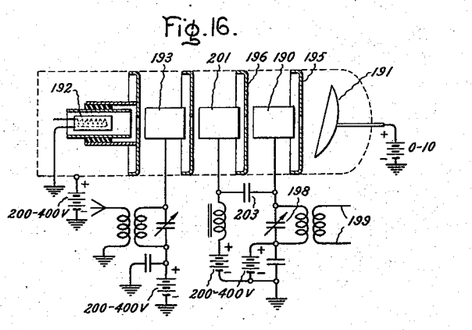

The electrode 190 is preferably of a length equal to the distance between adjacent charge density maxima and minima in the beam or to an odd multiple of such distance. Consequently, in accordance with the principles previously explained, alternating current variations are induced in the electrode structure. By means of an externally connected tuned circuit 198 these current variations are transformed into potential variations to be impressed across output terminals 199.

It will be seen that variations in the potential level of the electrode 190 produced by the effects referred to in the last paragraph will tend to cross modulate the electron beam current which passes through the electrode on its way toward the collecting anode 191. In order to prevent regenerative oscillations from being produced in this way we have provided means for neutralizing the effects referred to. Such means may comprise a neutralizing electrode 201 of similar dimensions to electrode 190 but arranged in a separate chamber shielded by the diaphragm 196, so as to be in energy-exchanging relation with only the velocity modulated portion of the beam. This electrode is biased to approximately the same voltage as the electrode 190 and is connected to that electrode by means of a condenser 203. Consequently, any variations in the potential level of the electrode 190 are accompanied by precisely similar variations in the potential level of the electrode 201 and similar modulation of the transmitted electron beam will be produced by both electrodes. It will be noted, however, that if the approach spaces between the electrodes and the boundary diaphragms are substantially negligible, the modulating effects produced by the electrodes on a given portion of the electron beam will be opposite in sign and will therefore cancel one another. Stated in another way, any acceleration of the beam which is produced by the electrode 201 will be neutralized by a corresponding retardation produced by the electrode 190.

Figure 17:
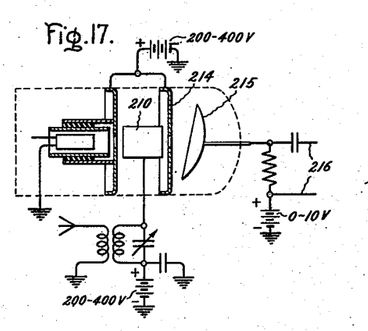
Fig. 17 shows one mode of applying the invention to a detector.
Figure 17A:
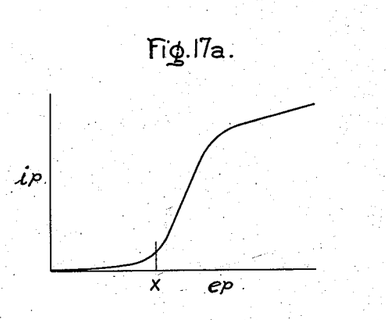
Fig. 17a shows the current-voltage characteristic of such a detector.

So far the principles of the invention have been described exclusively in connection with discharge devices adapted to be used as amplifiers. It will be apparent to those skilled in the art that its use is by no means limited to such field of application, and in Figs. 17 to 19 we have illustrated some exemplary tube constructions applied to purposes other than amplification. In Fig. 17, for example, we have shown a tube corresponding in essential particulars to that described in connection with Fig. 4 in combination with circuit elements adapted to cause the tube to operate as a detector. A velocity modulating grid 210 is shown as being connected to an input circuit which may be assumed to be energized with a signal voltage which comprises a carrier frequency modulated with audio frequency. It will be understood, therefore, that in the operation of the tube an electron beam which leaves the modulating space by passing through a central opening in a boundary diaphragm 214 will be velocity modulated in accordance with the variations in the carrier voltage impressed on the modulating grid. In order to accomplish rectification or detection of such a beam, the beam is caused to approach a tilted anode 215 which is biased to such a potential as to reverse at least the lower velocity component of the beam. As in cases previously explained, the anode is so tilted that the reversed component current is not returned into the modulated space. The operating characteristic of such an anode is shown in Fig. 17a and it is understood that in the use of the device for the purposes indicated the anode is preferably biased to a portion of the characteristic indicated at X. It is self-evident that under these conditions the device will produce rectification of the beam and will develop a potential of audio frequency across output potentials 216. It has already been explained in connection with Fig. 4 that the same tube if operated on a linear portion of its characteristic may be used to produce effective distortionless amplification without detection.

Figure 18:
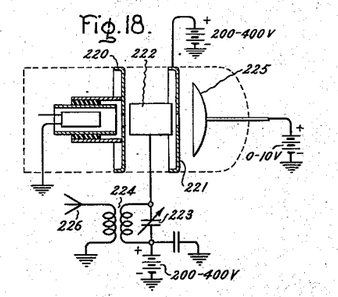
Fig. 18 shows one mode of applying the invention to an oscillator.

In Fig. 18 there is shown the discharge device of Fig. 17 slightly modified to operate as an oscillator. With the arrangement shown, there is provided a velocity modulating space defined by boundary diaphragms 220 and 221 and containing a velocity modulating grid 222. This grid is connected externally to an oscillating circuit comprising, for example, a condenser 223 and an inductance 224 and is adapted to be cyclically varied in potential level in accordance with the oscillations of such circuit. The electron beam after being velocity modulated by passage through the modulating space is directed toward an anode 225, which is adapted to reverse a portion or all of the beam thereby converting velocity modulation into charge density modulation. The charge density modulated component is returned into the modulating space and caused to pass through the grid 222. If this grid is of such length that the electron transit time therethrough corresponds to a half wave length of the tuned frequency of the oscillating circuit, energy at such frequency will be returned to the circuit. The energy thus abstracted from the beam will serve to maintain the system in self-sustained operation. The energy which is developed in the oscillating circuit may be utilized as a practical matter by being fed into an antenna 226 which is suitably coupled to the circuit. A system such as that described may advantageously be used in the transmission of ultra high frequencies.

Figure 19:
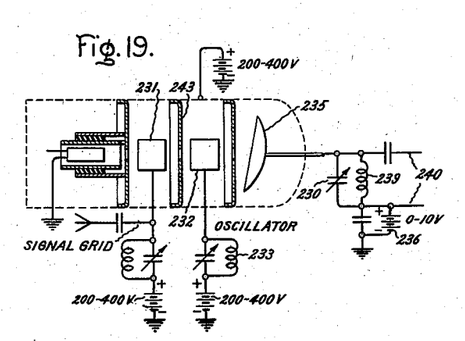
Fig. 19 shows one mode of applying the invention to a converter.

Somewhat greater complexity is involved in adapting the invention to converter or superheterodyne operation although this may be done in a practical manner by an arrangement such as illustrated in Fig. 19. In this case the electron beam may be velocity modulated by a control potential having a carrier frequency component through the agency of a control grid 231. The beam is then passed through a tubular electrode 232 which may be connected to a local oscillator circuit 233 adapted to oscillate at a selected frequency higher or lower than the carrier frequency.

For the purposes now contemplated the electrode 232 should be constructed and arranged in accordance with the principles described in connection with Figs. 1 to 3 hereof, so that additional velocity modulation will be imparted to the beam during its passage through the modulating space which encloses the electrode. Referring to a tubular electrode construction such as that illustrated, the electron transit time through the electrode should correspond to an odd number of half cycles of the oscillator frequency. If this condition is fulfilled, the beam will be given a component of modulation corresponding to the selected frequency of the oscillating circuit.

This doubly modulated beam is then caused to approach a tilted electrode or anode 235 which is adapted to reverse at least the lower velocity portion of the beam. This anode is preferably biased by means of a battery 236 so as to operate on that portion of its characteristic indicated at X in Fig. 17a. As a result of such operation, there will be a mixing or cross modulation of the two modulation frequencies of the approaching beam so that the reversed component of the beam will include both sum and difference frequencies. Consequently, if the circuit including the condenser 230 and inductance 239 is tuned to the difference or intermediate frequency, potential variations of this frequency may be developed across the terminals 240.

It is also true, as will be readily understood by those skilled in the art, that the reversed portion of the current will contain a component of charge density modulation corresponding in frequency to the velocity modulation produced by the tubular electrode 232. Consequently as such reversed portion passes through the electrode it will induce current variations therein having a frequency corresponding to the frequency of tuning of the oscillator circuit. These induced currents will under proper conditions be such as to make the oscillations of the circuit self-sustaining so that no external energy need be supplied to maintain the operation of the oscillating system.

As illustrated the anode 235 is tilted at such an angle that the reversed current component intersects a boundary diaphragm 243, and is thus prevented from entering the modulating space which contains the grid 231.

For the sake of simplicity the structural features of the invention have so far been described solely in connection with an end-to-end arrangement of the electrodes. Such an arrangement is by no means essential, however, and in Figs. 20 and 21 there is shown an example of an entirely different structure which nevertheless embodies the principles of the invention.

Figure 20:
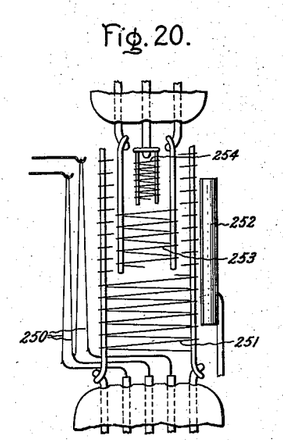
Figs. 20 and 21, respectively are side elevation and plan views of an alternative electrode arrangement

Referring to Fig. 20, there is shown a discharge device in which the electron source comprises a "hairpin" filament 250 which is of substantial longitudinal extent. This filament or cathode is mounted in side by side relationship with a grid 251 adapted partially to shield the same and is arranged diametrically opposite to an anode 252.

Within the grid 251 there is provided an additional grid 253 which is similar in function to the "boundary diaphragms" hereinbefore described. That is to say, the grid 253 defines a modulating space which may enclose a control electrode structure, here represented in the form of a grid-like spiral 254. As a matter of practical design the grid 253 and the control electrode 254 may be arranged as the respective elements of a concentric transmission line which is of such dimensions as to be properly tuned to the frequency of a control potential to be applied thereto (see Fig. 22).

In the operation of the device an electron stream is developed in the direction of the anode 252 by means of a relatively high potential (say 300 volts) impressed between the cathode 250 and the intermediate grid 253. Excessive electron emission from the cathode is prevented by charging the grid 251 to a relatively low potential, on the order of a few volts positive or negative, with respect to the cathode.

Figure 21:
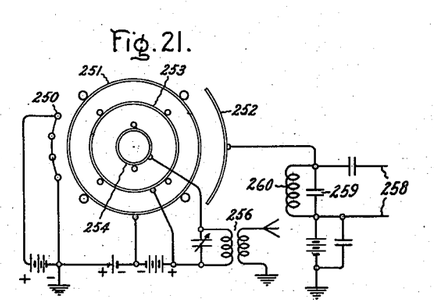
Figure 22:
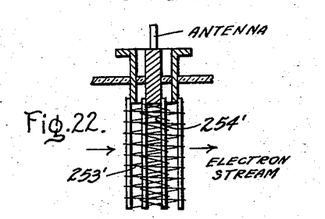
Fig. 22 is an incomplete view showing a practical mode of use of certain of the electrodes of the device of Fig. 20.

As the electron stream enters the modulating space formed by the grid 253, it may be velocity modulated by means of a suitably varying potential impressed on the grid 254 by an input circuit 256, as shown in Fig. 21 (or alternatively, by the practical arrangement indicated in Fig. 22). The velocity modulation then may be converted into charge density modulation by maintaining the anode 252 at a sufficiently low potential to reverse at least a portion of the beam. In this case the reflected components of the beam will be largely collected by the grid 251 and will thus be prevented from returning to the modulating space. Energy may be abstracted from the charge density modulated components of the electron stream by means of the anode 252 in combination with a suitable output circuit typically represented at 258, and comprising a condenser 259 and an inductance 260.

It is an advantage of the construction just described that an electron stream of considerable cross-sectional area may be employed. For this reason, in some cases the power which may be handled by the device will be in excess of that possible with devices employing a pencil-like electron beam as in the other structures described.

While I have described the invention primarily in connection with pure electron discharges, the principles of the invention are equally applicable to the control and conversion of currents involving charged particles other than electrons. For example, if one has due regard to the dimensional changes required by the different velocities and masses involved, a direct application of the invention may be made to discharge devices utilizing positive ion currents. I aim in the appended claims to cover all variations in structure and application which fall within the true spirit and scope of the foregoing disclosure.

What I claim as new and desire to secure by Letters Patent of the United States, is:

1. In combination, a discharge device including a thermionic cathode for developing an electron beam of substantially constant average intensity, a pair of spaced diaphragms arranged transverse to the beam path, such diaphragms being provided with openings to permit passage of the beam therethrough and being normally maintained at a fixed potential with respect to the cathode, an electrode arranged within the space bounded by the diaphragms for controlling the potential level of an intermediate region of such space, means including a source of control potential effective during the use of the device to raise and lower the potential of the control electrode at such a rate that individual electrons traversing the space are similarly affected in velocity as they approach and recede from the said intermediate region, and means including a utilization circuit for effectively abstracting energy at alternating potentials from the beam after its issuance from the modulating space.

2. In combination, a discharge device comprising means including a thermionic cathode for developing an electron beam of substantially constant average intensity and velocity, a pair of spaced diaphragms arranged transversely to the beam, both of said diaphragms being provided with openings to permit passage of the beam therethrough and being normally maintained at a fixed potential with respect to one another, a control electrode structure within the space defined by said diaphragms for controlling the potential of a region thereof traversed by the beam, means including a portion of said control electrode structure for maintaining an intermediate part of said region at a lower average potential than the end portions thereof, means including a source of control potential for raising and lowering the potential level of the control electrode structure as a whole with respect to the potential of said diaphragms, and means for abstracting energy from the electron beam after its passage through said space.

3. In high frequency apparatus the combination which includes means for developing an electron beam, a plurality of apertured conducting diaphragms arranged transversely of the beam and defining a series of modulating spaces to be successively traversed by the beam, a control electrode in each of the modulating spaces, means including a source of control potential for simultaneously raising and lowering the potential level of the various control electrodes with respect to the adjacent conducting diaphragms, said control electrodes and spaces being so proportioned with reference to the average beam velocity and the frequency of the control potential that any given electron in the beam is similarly affected in velocity as it passes through each of the modulating spaces, and means including an alternating current circuit for effectively utilizing the cyclical variations existing in the beam after its passage through the modulating spaces.

4. In combination, means for developing a velocity modulated electron beam, means for reversing at least a portion of the beam to convert its velocity modulation into charge density modulation, means comprising an electrode in energy-exchanging relation with both the velocity modulated beam and the reversed charge density modulated portion thereof for converting kinetic energy in the latter portion into electrical energy to be utilized in an external circuit, and means for neutralizing the effects of potential variations of said electrode on the velocity modulated beam.

5. In combination, means for developing a velocity modulated electron beam, means for reversing at least a portion of the beam in order to convert its velocity modulation into charge density modulation, means including an electrode in energy-exchanging relation with both the velocity modulated beam and the reversed charge density modulated portion thereof for converting kinetic energy in the latter portion into electrical energy to be utilized in an external circuit, and a second electrode in energy-exchanging relation with only the velocity modulated portion of the beam, said second electrode being variable in potential with the first electrode and serving to neutralize the effects on the velocity modulated beam of variations in potential of said electrode.

6. In an amplifier or detector for use under conditions such that transit time phenomena play a controlling part in the operation of the apparatus, the combination which includes means for developing a stream of electrons, a pair of spaced conducting members arranged to be successively traversed by the stream, an electrode located within the space bounded by the members, said electrode comprising a hollow conducting tube substantially coaxial with the beam and extending to within a short distance of each of the members, means including an input circuit for impressing a cyclically variable potential of predetermined frequency between the tube and the members, the axial length of the tube being so correlated to the average velocity of the electron stream that at the said predetermined frequency of operation any given electron in the stream is similarly affected in velocity as it approaches and recedes from the tube, and means including an output circuit for effectively utilizing the cyclical variations occurring in the stream subsequent to its issuance from the space bounded by the said conducting members.

7. In apparatus for use under conditions such that transit time phenomena play a controlling part in the operation of the apparatus, the combination which comprises means including a cathode for developing a stream of electrons, a pair of spaced conducting members arranged to be successively traversed by the stream, means for maintaining said members at a fixed potential with respect to the cathode, an electrode of negligible axial extent arranged midway between said members, and means including a source of control potential for cyclically raising and lowering the potential of said electrode with respect to the conducting members, the spacing between said electrode and each of the members being such that the electron transit time from either member to the plane of the electrode corresponds at least approximately to an odd number of half cycles of the control potential.

8. In high frequency apparatus, means including a cathode for developing an electron stream of substantially constant average intensity and velocity, means including a control electrode acting symmetrically on the stream to produce longitudinal velocity modulation thereof, means shielding the said control electrode from the cathode to avoid the production of appreciable charge density variations in the vicinity of the electrode, means providing a shielded drift space to be traversed by the velocity modulated stream subsequent to its issuance from the electrode, such space being of sufficient length to permit the conversion of the velocity modulation of the beam into charge density modulation of substantially greater magnitude, and circuit means for effectively utilizing the variations existing in the charge density modulated stream after its passage through the drift space.

9. In high frequency apparatus, means for producing a beam of similarly charged particles, a modulating electrode traversed by the beam, shielding means for defining a region of fixed potential level on either side of said electrode, means for cyclically raising and lowering the potential of said electrode with respect to said shielding means at such a rate that individual particles traversing the electrode are similarly affected in velocity as they approach and recede from such electrode, and means including a high frequency circuit for utilizing conduction current variations occurring in the beam after its issuance from the second of the said regions of fixed potential level.

10. In high frequency apparatus, means including a cathode for producing a beam of electrons of substantially constant average intensity and velocity, a pair of spaced conducting members arranged to be successively traversed by the beam, means for maintaining said members at fixed potential with respect to the cathode, a modulating electrode within the space between said members, means for cyclically raising and lowering the potential of said electrode with respect to said members at such a rate that any given electron traversing the said space is similarly affected in velocity as it approaches and recedes from said electrode, and means including a high frequency circuit for utilizing conduction current variations occurring in the beam after its issuance from the space bounded by the said conducting members.

11. In high frequency apparatus, means for producing a beam of similarly charged particles, a pair of spaced conducting members arranged to be successively traversed by the beam, a modulating electrode structure within the space between said members and defining an equipotential region of substantial length, circuit means for cyclically raising and lowering the potential of said structure with respect to said members at such a rate that individual particles traversing the said space are similarly affected in velocity as they approach and recede from such region, and means including a high frequency circuit for utilizing conduction current variations occurring in the beam after its issuance from the space bounded by the said conducting members.

12. In apparatus for use under conditions such that transit time phenomena play a controlling part in the operation of the apparatus, the combination which includes means for developing a stream of electrons, a pair of spaced conducting members arranged to be successively traversed by the stream, a hollow conducting tube within the space between said members, said tube being substantially coaxial with the beam and extending to within a short distance of each of the members, circuit means for impressing a cyclically variable potential of predetermined frequency between the tube and the members, the axial length of the tube being so correlated to the average velocity of the electron stream that at the said predetermined frequency of operation any given electron in the stream is similarly affected in velocity as it approaches and recedes from the tube, and circuit means for effectively utilizing the cyclical variations occurring in the stream subsequent to its issuance from the space bounded by the said conducting members.

13. In high frequency apparatus, means for developing a beam of similarly charged particles, means for modulating the beam at a particular frequency to produce cyclically recurrent variations axially of the beam, a utilization circuit of such character as to be readily excited at the said particular frequency, and an output electrode system coupled to the said utilization circuit and arranged to be traversed by the beam after its traversal of the said modulating means, the said output system comprising an output electrode traversed by the beam and shielding means defining a region of fixed potential level on either side of the said electrode, the axial dimensions of the said output system being so correlated to the average beam velocity that as a result of potential variations of the said electrode attributable to its coupling with the utilization circuit, any given particle in the beam is similarly affected in velocity as it approaches and recedes from the electrode.

14. In high frequency apparatus, means for developing a beam of electric charges, means for modulating the beam at a particular frequency to produce cyclically recurrent variations axially of the beam, and an output system arranged to be traversed by the beam subsequent to the operation of the said last-named means thereon, said output system including a utilization circuit of such character as to be readily excited at the said particular frequency, a pair of spaced conducting members which are successively traversed by the beam, and an electrode structure arranged within the space bounded by said members and defining an equipotential region therein, the said electrode structure being connected to the said utilization circuit and the said equipotential region being of such axial extent that, as a result of potential variations of the structure produced by said circuit, any given element of the beam is similarly affected in velocity as it approaches and recedes from such region.

15. In high frequency apparatus, means for developing a beam of electric charges, means acting on the beam at a particular frequency to produce recurrent charge density variations axially thereof, and an output system arranged to be traversed by the beam subsequent to the operation of the said last-named means thereon, said output system including a circuit of such character as to be readily excited at the said particular frequency, a pair of spaced conducting members arranged to be successively traversed by the beam, and a hollow tubular electrode structure positioned coaxially with the beam between said members and slightly spaced from the members at its extremities so as to provide a pair of spaced gaps, said electrode structure being connected to the said utilization circuit and being of such axial extent that any given element of the beam is similarly affected in velocity by the potential gradients produced in both gaps by the action of said circuit.

16. In apparatus for use under conditions such that transit time phenomena play a controlling part in the operation of the apparatus, the combination which comprises means for developing an electron beam of substantially constant average intensity and velocity, an input electrode system comprising a pair of spaced conducting members arranged to be successively traversed by the beam and a hollow conducting tube within the space between said members, said tube being substantially coaxial with the beam and extending to within a short distance of each of the members, means for impressing a cyclically variable potential of predetermined frequency between the tube and the members, the axial length of the tube being so correlated to the average velocity of the electron stream as to assure effective mutual reaction therewith at the said predetermined frequency of operation, an output electrode system structurally similar to the said input system and arranged to be traversed by the beam after its traversal of the input system, and circuit means coupled to the said output electrode system and adapted to be excited by the reaction of the beam on such system.

17. In an amplifier or detector for use under conditions such that operation is controlled by transit time phenomena, the combination which comprises means including a cathode for developing an electron stream of substantially constant average intensity and velocity, a control electrode structure acting symmetrically on the stream and operable to produce longitudinal velocity modulation thereof, means for sufficiently shielding the operative portion of said control electrode structure from the cathode to avoid the production of substantial variations in the cathode emission as a result of the action of such structure, means connected with said control electrode structure for exciting the same at ultra-high frequency, means providing a shielded drift space to be traversed by the velocity modulated beam after its traversal of the said control electrode structure, such space being of sufficient length to permit the conversion of the velocity modulation of the beam into charge density modulation of appreciably greater magnitude, and means including an output circuit for effectively utilizing the variations existing in the beam after its passage through the drift space.

18. In apparatus for use under conditions such that transit time phenomena play a controlling part in the operation of the apparatus, the combination which comprises means for developing an electron beam, a modulating electrode system comprising a pair of spaced conducting members arranged to be successively traversed by the beam and a hollow conducting tube within the space between said members, said tube being substantially coaxial with the beam and extending to within a short distance of each of the members, means for impressing a cyclically variable potential of predetermined frequency between the tube and the members, the axial length of the tube being so correlated to the average velocity of the electron stream that at the said predetermined frequency of operation any given electron in the beam is similarly affected in velocity as it approaches and recedes from the tube, means providing a drift space to be traversed by the beam and wherein velocity variations produced by said modulating system may be converted into charge density variations, an energy-abstracting electrode system structurally similar to the said modulating system and arranged to be traversed by the beam after its issuance from the drift space, and circuit means coupled to the last named electrode system of such character as to be readily excited by the reaction of the beam on such system.

19. A method of amplifying high frequency impulses which comprises producing a beam of electrons of uniform velocity, producing longitudinal velocity modulation of the beam in accordance with the impulses to be amplified, directing the modulated beam along a shielded path which is long in comparison with the distance traversed by the beam during one cycle of the impulses to be amplified, thereby setting up in the beam longitudinal variations in charge density corresponding to the previously produced velocity modulation thereof, and utilizing said charge density variations to produce an output current.

20. In an amplifier or detector for use under conditions such that operation is controlled by transit time phenomena, the combination which comprises means for producing a beam of electrons of substantially uniform velocity, means for producing longitudinal velocity modulation of the beam, means providing a shielded space to be traversed by the velocity modulated beam, such space being of sufficient length to permit the conversion of the velocity modulation of the beam into charge density modulation of appreciably greater magnitude, and means including an output circuit for effectively utilizing the variations existing in the beam after its passage through the said space.

21. In an amplifier or detector for use at ultra-high frequencies, the combination which includes means for producing a beam of electrons of substantially uniform velocity, electrode structure defining a narrow gap to be traversed by the beam, means acting on the beam at the said gap to produce longitudinal velocity modulation thereof in accordance with the signals to be amplified or detected, means providing a shielded space to be traversed by the velocity modulated beam after having passed the said gap, such space being of sufficient length to permit the conversion of the velocity modulation of the beam into charge density modulation of appreciably greater magnitude, and means for utilizing the variations existing in the beam after its passage through the said space to produce an output current.

WILLIAM C. HAHN.